Nov. 19, 1935.  R. F. PEO.  2,021,427
VALVE MECHANISM
Original Filed Feb. 7, 1931  3 Sheets-Sheet 2
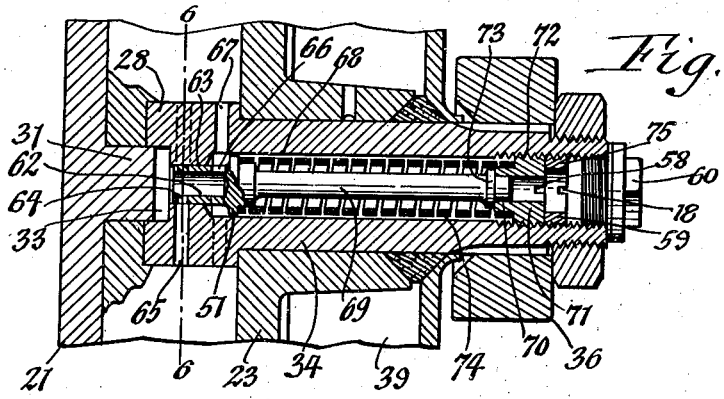
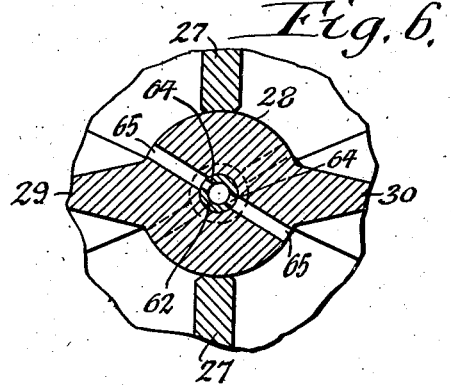
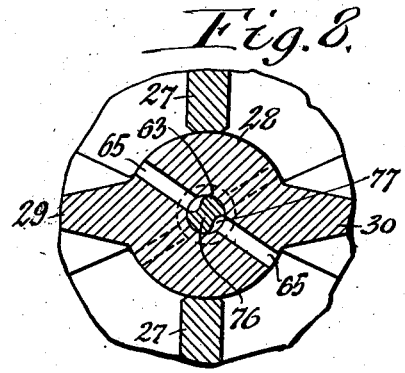
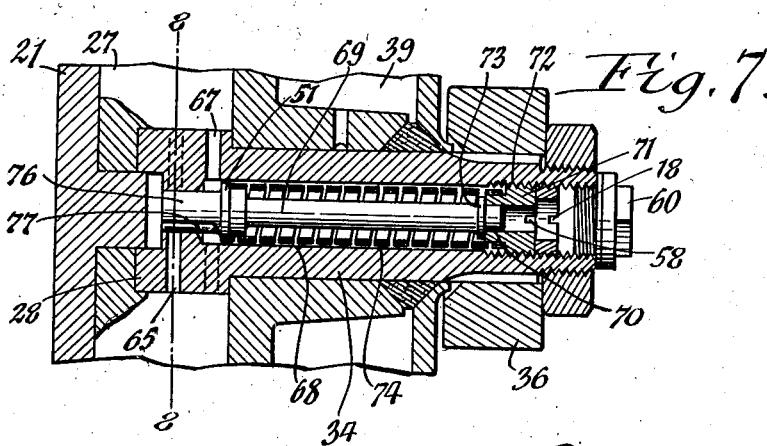
Inventor
Ralph F. Peo
By Polipp Powers
Attorneys Nov. 19, 1935.  R. F. PEO  2,021,427
VALVE MECHANISM
Original Filed Feb. 7, 1931    3 Sheets-Sheet 3
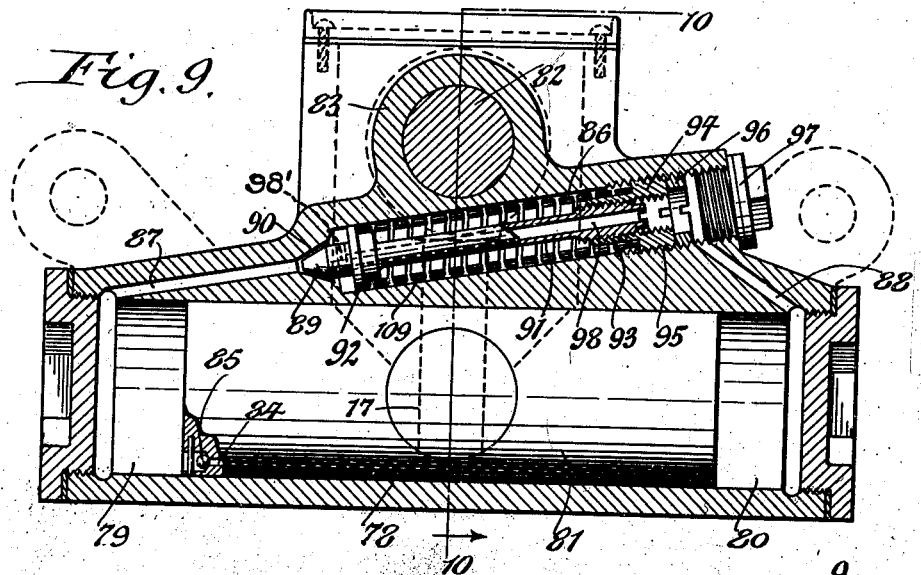
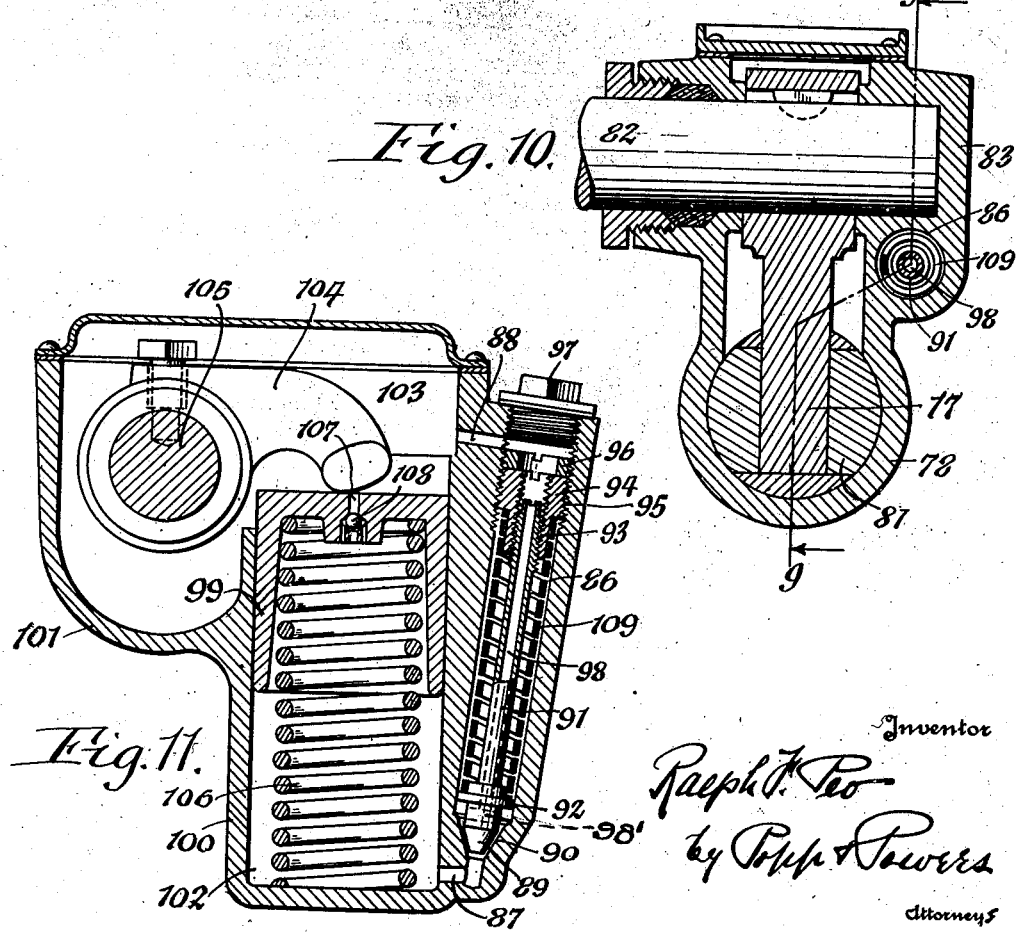
Inventor
Ralph F. Peo
by Philip F. Powers
Attorneys Patented Nov. 19, 1935

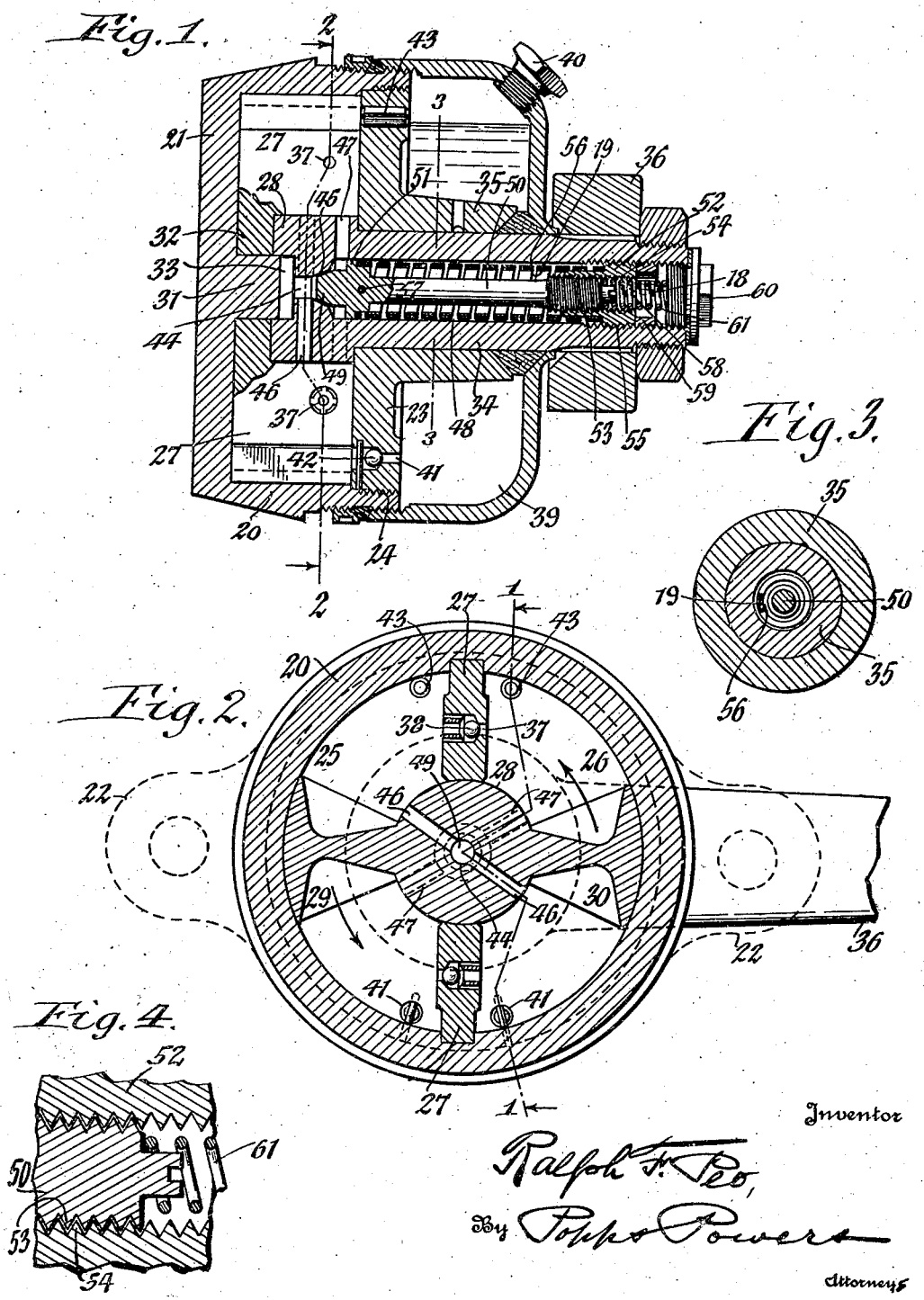

2,021,427

UNITED STATES PATENT OFFICE 2,021,427

VALVE MECHANISM

Ralph F. Peo, Buffalo, N. Y., assignor to Houde Engineering Corporation, Buffalo, N. Y., a corporation of New York Application February 7, 1931, Serial No. 514,094
Renewed July 2, 1934

31 Claims. (Cl. 188—100)

This invention relates to a hydraulic shock absorber which includes among other elements a working chamber containing a resistance liquid and a piston movable back and forth in said chamber, said piston and the body containing the working chamber being connected to the relatively movable members between which the shock is to be absorbed, such as the body and axle of an automobile. Heretofore in shock absorbers of this character the resistance liquid flows less freely in cold weather than in warm weather and in the absence of any provision to compensate for this difference in the action of the liquid the absorber would be liable to offer too much resistance to shock in cold weather and too little in warm weather.

It is therefore the purpose of this invention to provide simple and efficient means whereby the flow of the resistance liquid is automatically regulated by thermostatic means which are responsive to temperature changes and cause the liquid to flow uniformly regardless of whether the temperature is high or low.

In the accompanying drawings:

Figure 1 is a vertical longitudinal section of a hydraulic shock absorber of the Houdaille type embodying my invention, this section being taken on line 1—1 Fig. 2.

Figure 2 is a vertical transverse section taken on line 2—2 Fig. 1, looking forwardly.

Figure 3 is a vertical section taken on line 3—3 Fig. 1.

Figure 4 is a fragmentary sectional view, on an enlarged scale, showing more particularly the screw connection between the regulating valve stem and the abutment sleeve with which it cooperates.

Figure 5 is a fragmentary longitudinal section similar to Fig. 1 showing a modified form of my invention.

Figure 6 is a cross section taken on line 6—6 Fig. 5.

Figure 7 is a longitudinal section similar to Figs. 1 and 5 showing another modified form of my invention.

Figure 8 is a cross section taken on line 8—8 Fig. 7.

Figure 9 is a vertical longitudinal section showing my invention embodied in a shock absorber having working chambers arranged at opposite ends of the cylinder, and a double-ended piston reciprocating in said cylinder.

Figure 10 is a vertical cross section taken on line 10—10 Fig. 9.

Figure 11 is a vertical section showing my invention embodied in a hydraulic shock absorber in which a single upright cylinder is employed in which a piston reciprocates vertically.

In the following description similar characters of reference indicate like parts in the several figures of the drawings.

In its general organization the shock absorber shown in Figs. 1–4 is constructed as follows:

The body of the shock absorber comprises a cylindrical wall 20 which is closed at its rear end by a fixed head 21 which is adapted to be secured to one of the relatively movable members between which the shock is absorbed, for instance the body or frame of an automobile. Fastening of this body to the automobile frame 15 is preferably effected by means of attaching lugs 22 which are arranged on opposite sides of the body and connected with the frame by means of bolts passing through the lugs 22. To the front end of the cylindrical wall 20 is secured a front head 23 by means of a screw joint 24 or otherwise, thereby forming with the wall 20 and the rear head 21 a cylindrical space which contains the means whereby the shock absorbing liquid is subjected to pressure for absorbing the shock.

This space is divided into two working chambers 25, 26 by a diametrical partition consisting in the present case of upper and lower partition sections 27 which are connected at their outer ends with the wall 20, while their inner ends are separated and receive between them the hub 28 of two pistons 29, 30 which oscillate in these working chambers. On its front or inner side the rear head is provided with a forwardly projecting centering or pilot pin 31 which passes through a centering ring 32 connecting the inner edges of the partition sections 27 at the rear ends thereof and also projecting into a recess 33 at the rear end of the hub 28 so that this pin serves as a rear bearing for the hub of the pistons.

On its front side the hub 28 is connected with the rear end of an operating shaft 34 which is journaled in a bearing 35 projecting forwardly from the central part of the front wall 23. At its front end this shaft is connected with the inner end of an operating arm or rock lever 36 which latter is connected with an axle of the automobile which is connected with a part movable relatively to the body of the automobile, for instance an axle which is connected with the body or frame by means of a spring system and carries the supporting wheels.

During the low pressure stroke of the pistons which occurs when the body of the automobile and the axle thereof move toward each other, the pistons move toward the low pressure ends of the working chambers, which movement is indicated by the direction of the arrow associated with these pistons in Fig. 2, and during a high pressure stroke of the same which occurs during rebound of the axle and body of the automobile from each other these pistons move in the opposite direction. Means are provided whereby the liquid is capable of passing with comparative freedom from the low pressure end of each working chamber to the high pressure end of the other working chamber during a low pressure stroke of the pistons, but during a high pressure stroke of the same, movement of liquid from the high pressure end of each working chamber to the low pressure end of the other working chamber is cut off, this being preferably effected by means of a by-pass port 37 arranged in each of the partition sections 27 and a check valve 38 arranged in each of these ports and adapted to close toward the respective low pressure end of one of the working chambers and to open toward the high pressure end of the other working chamber.

Liquid is automatically supplied to the working chambers as required from a replenishing chamber 39 which is arranged in front of the working chambers and is adapted to be filled as required through an opening in its top which is normally closed by a plug 40. Delivery of the resistance liquid from this replenishing chamber into the working chambers may be effected by means of one or more replenishing ports 41 connecting either one or both of the lower ends of the working chambers with the lower part of the replenishing chamber, and each of these ports containing a check valve 42 which closes toward the replenishing chamber and opens toward the respective working chamber.

Any air contained in the liquid is permitted to escape from the upper ends of the working chambers into the upper part of the replenishing chamber through a vent 43 extending through the upper part of the front head 23 from the upper end of either one or both of the working chambers to the upper part of the replenishing chamber.

The hub of the pistons is provided in its central part with a longitudinal controlling port 44 which contains a valve seat 45 and is connected in rear of said valve seat by laterally extending passages 46 with the high pressure ends of the working chambers and also connected in front of said valve seat by means of laterally extending passages 47 with the low pressure ends of the working chambers, as shown in Figs. 1 and 2. During the high pressure strokes of the pistons some of the resistance liquid is forced from the high pressure ends of the working chambers through the high pressure passages 46, controlling port 44 and low pressure passages 47 into the low pressure ends of the working chambers; and during the low pressure strokes of the pistons some of this resistance liquid is forced from the low pressure ends of the working chambers through the low pressure passages 47, controlling port 44 and high pressure passages 46 into the high pressure ends of the working chambers, thereby providing a yielding liquid resistance to the movement of the pistons and absorbing the shock which is imposed upon the vehicle accordingly.

It has been found that, when the instrument and the resistance liquid becomes warm by use or during warm weather, the resistance liquid becomes thinner and flows more readily, whereas when the instrument and liquid are cold during cold weather or lowered temperature conditions the resistance liquid becomes thicker and therefore flows less freely through the controlling port and the passages communicating therewith which would vary the shock absorbing action of the instrument accordingly if no means were provided to avoid such variation.

The present invention consists in the provision of improved means whereby the capacity of the controlling port and passages which permit the liquid resistance to pass from one part of the working chamber to another would be automatically varied in response to variations in the temperature of the instrument and the resistance liquid so that the flow of this liquid is restricted to a greater extent when the liquid is thin during warm temperature conditions and is permitted to flow more freely when it is thicker during low temperature conditions.

The particular form of this temperature responsive mechanism for automatically controlling the capacity of the controlling port and passages which is shown in Figs. 1, 2, 3 is constructed as follows:—

The numeral 48 represents a valve chamber which is arranged lengthwise in the operating shaft 34 and extends forwardly from the port 44 to the front end of this shaft, this chamber being practically a forward continuation of the controlling port 44. Within the rear part of this valve chamber is arranged a controlling or regulating valve 49 which is movable lengthwise toward and from the valve seat 45 for the purpose of varying the capacity of the controlling port and passages leading from the same to the working chambers. The cooperating faces of the valve seat 45 and the controlling or regulating valve 49 are preferably of conical form, as shown in Fig. 1, although any other suitable shape may be used if desired. This controlling valve is arranged at the rear end of a valve stem 50 which is arranged axially in the valve chamber and movable lengthwise therein, and also capable of rotation.

In order to maintain the controlling valve constantly in axial alignment with the controlling seat 45 and thereby cause the spacing between this valve and the seat to be uniform annularly between these valve surfaces and also prevent noisy vibration or action of this valve, a centering or guide collar 51 is arranged on the valve stem immediately in front of the controlling valve, which centering collar engages with the bore of the valve chamber 34 and permits the valve stem and the controlling valve to move freely lengthwise toward and from the valve seat 45, but prevents this valve and the adjacent part of the valve stem from moving laterally, thereby insuring the uniform flow of the resistance liquid around the valve and to and from the opposite ends of the working chambers for insuring uniform and noiseless action of the instrument.

At its front end the valve stem is mounted upon an abutment sleeve 52 in such manner that the valve stem and this abutment sleeve can be adjusted lengthwise relatively to each other, this being preferably effected by providing the front part of the valve stem with an external screw thread 53 which engages with an internal screw thread in the bore of the abutment sleeve, as shown in Fig. 1.

The abutment sleeve is also adjustable lengthwise on the operating shaft 34 by means of a screw connection 55 between the periphery of the front part of the abutment sleeve 52 and the bore of the operating shaft.

Arranged within the central part of the valve chamber and surrounding the adjacent part of the valve stem is a thermostatic element which is adapted to move or change its position in response to temperature changes and is operatively connected with the valve and the abutment 52 so that the changing in the position of this thermostatic element will cause the regulating valve and its stem to turn and thereby move this valve toward or from its seat due to the screw threaded connection between the front end of the valve stem and the abutment sleeve. This thermostatic element is preferably made in the form of a helix which surrounds the valve stem and is composed of bi-metal, for example two metals having different rates of expansibility such as an outer layer or strip of bronze or brass 19 and an inner layer or strip 56 of ordinary iron or invar iron, these two strips being connected with each other so that they in effect form an integral member, which upon being subjected to an increase in temperature will uncoil and helically increase the length of the convolutions of the thermostatic element by tortional action, and upon being cooled to a lower temperature will cause the convolutions of the helical member to contract and shorten helically.

One part of this helical bi-metallic thermostat element is connected with the controlling or regulating valve and another part thereof with the abutment 52, this being preferably accomplished by connecting the rear end of this helical thermostat element with the rear part of the valve stem at its junction with the regulating valve while the front end of this thermostat element is connected with the inner or rear end of the abutment 52. The connection between the rear end of this helical thermostat member and the valve stem may be effected by brazing, spotwelding or by means of a transverse pin 57; and the front end of this element may also be connected with the abutment 52 by means of sweating, brazing or any other suitable means.

Upon subjecting the thermostat element to an increase in temperature due to the heating of the instrument or the resistance liquid arranged therein, the expanding distortion of the thermostat element will cause the opposite ends of the same to rotate one relatively to another in a direction for causing the regulating valve and its stem to be turned in the direction which will cause the screw connection 53, 54 between the valve stem and the abutment 52 to move the regulating valve toward the seat 45 of the regulating or controlling port; while a reduction in the temperature to which the thermostat element is exposed due to cooling of the instrument or resistance liquid therein will cause the thermostat helix to contract tortionally and its rear end to turn in a reversed direction relative to the front end thereof, whereby the regulating valve will be rotated in the opposite direction together with the valve stem and caused to move away from the regulating valve seat 45 due to the wedge action of the screw connection 53, 54 above referred to.

It follows from this that when the temperature of the instrument and its liquid content rises and the resistance liquid as a consequence becomes thinner, then the regulating valve will be closed more or less and if the temperature of the instrument and the resistance liquid therein is lowered and the resistance liquid as a consequence becomes thicker, then the regulating valve will be automatically moved more or less away from its seat thereby permitting the flow of the resistance liquid to be regulated in accordance with its consistency and causing the shock absorber to operate with uniform effectiveness under varying temperature conditions.

The position of the regulating valve 49 may be manually adjusted to suit the particular character of resistance liquid which is used and other conditions by turning the abutment 52 forwardly or backwardly, this being possible by engaging a screw driver or similar instrument with notches 58 in the front end of the abutment sleeve, which instrument may be introduced into the front end of the operating shaft for this purpose. After adjustment the abutment sleeve 52 is held against turning by means of a jam nut 59 working on the internal screw thread of the operating shaft and engaging with the front end of the abutment 52, as shown in Fig. 1. This jam nut is preferably constructed in the form of a ring and provided with a notch 18 for receiving a screw driver whereby the same may be turned. After such adjustment the front end of the operating shaft is preferably closed by means of a screw plug 60.

The joint between the screw thread 53 on the valve stem and the screw thread 54 in the abutment may be made sufficiently loose so that a slight amount of slack exists between these threads and thereby permits the valve stem to be turned easily and with comparative freedom by the tortional action of the thermostatic element as the latter is subjected to either an increasing or decreasing temperature. The fit between these two screw threads is preferably sufficiently loose so that the valve stem practically floats within the abutment sleeve when the threads of the valve stem are in an intermediate position between opposite sides of the threads on the abutment sleeve 52, as shown in Fig. 4, and thereby enabling the regulating valve to be turned easily by the thermostatic element at such times. The abutment sleeve 52 forms a journal and guide bearing for the front end of the valve which cooperates with the guide collar 51 to keep the valve structure properly axially centered and alined relative to the valve seat 45 as the valve is rotated and axially shifted.

By virtue of the loose threading connection the valve structure has limited direct axial movement relative to the abutment 52. The regulating valve and its stem are pushed axially forwardly during the high pressure operation of the shock absorber, at which time the resistance liquid is pressed forwardly from the high pressure passage 46 through the regulating port 44 and out through the low pressure regulating passages 47 at which time the resistance fluid bears forwardly against the rear end or face of the valve 49 and causes the front sides of the threads of the valve stem to bear against the rear sides of the threads 54 in the abutment sleeve 52.

When the pressure of the resistance liquid in the working chamber is reversed during the low compression action of the instrument the resistance liquid flows backwardly through the low pressure passages, the regulating port 44 and the high pressure passages 46 into the high compression ends of the working chambers, at which time the regulating valve 49 is not subjected to any appreciable end pressure. At this time the valve stem is moved axially into its rearmost position together with the regulating valve by means of a spring 61 interposed between the front end of the valve stem and the plug or closure 60 so that the rear side of the screw threads 53 on the valve stem engage with the front side of the threads 54 in the abutment sleeve 52.

With the arrangement described, the pressure of spring 61 tends to hold the valve in position for flow of the fluid under normal pressure conditions. Should the pressure exceed normal, particularly during rebound movement of the vehicle spring, the spring 61 will yield to pressure against the valve and the valve will be moved to increase the flow passageway in accordance with the increased pressure, the extent of such movement being determined by the degree of looseness or play in the thread connection between the valve stem and the abutment 52.

Instead of moving the regulating valve and its stem lengthwise for regulating purposes by the torsional action of the helical thermostatic element, the regulating valve may be so constructed that the area of the regulating ports and passages communicating with the working chambers may be opened or closed solely by rotative action of the valve.

An organization of this character is shown in Figs. 5 and 6 in which a hollow, balanced, rotary regulating valve 52 turns in a circular valve seat 63 and is provided at its rear end with high pressure ports 64 which are adapted to communicate with high pressure passages 65 leading to the high pressure ends of the working chambers, while the front end of the valve 62 is provided with ports 66 which communicate constantly with low pressure regulating passages 67 through the medium of a valve chamber 68 extending lengthwise through the center of the operating shaft 34 from the valve seat 63 to the front end of this shaft, as shown in Fig. 5. This rotary regulating valve 62 is mounted on the rear end of a rotary valve stem 69 which is journaled at its front end in a bearing 70 formed on the rear part of an abutment sleeve or bushing 71 which is connected by means of a screw joint 72 with this abutment.

The front part of the valve stem 69 is provided with a forwardly facing shoulder 73 which engages with the rear end of the abutment sleeve 71 and thereby prevents the valve stem 69 and its valve 62 from moving forwardly.

A bi-metallic helical thermostat member 74, similar to the element 55, 56 shown in Fig. 1, is employed in the construction shown in Fig. 5 between the bore of the operating shaft 34 and the valve stem 69, which element 74 is connected at its rear end by sweating, brazing, pinning or otherwise to the rear part of the valve stem 69, while its front end is connected with the rear end of the abutment 71. As the free rear end of the helical thermostat element is rotated relative to the front fixed end thereof as the result of a torsional action of this element in response to the variations in temperature to which the same is subjected, the valve 62 is turned into a more or less open or closed position for the purpose of reducing the cross sectional area of the regulating passages as the temperature increases, and increasing the cross sectional area of these passages as the temperature is lowered.

For the purpose of manually adjusting the capacity of the regulating passages to suit the character of the resistance liquid which is being used or other conditions the regulating valve 62 may be moved lengthwise forwardly or backwardly for bringing its rear ports 64 into more or less complete register with the rear regulating passages 65, this being accomplished by turning the abutment 71 so that its screw connection with the operating shaft will carry the regulating valve and its stem together with the thermostatic element forwardly or backwardly as desired. After such adjustment the abutment 71 may be fastened in its adjusted position by means of a jam nut 75 engaging the internal thread of the operating shaft and engaging with the front end of the abutment sleeve 71, as shown in Fig. 5.

The thermostat coil may expand and contract axially during temperature changes but such movement will not subject the coil to any stresses or strains because the journaling of the cylindrical valve in its seat and the journaling of the outer end of the valve stem in the abutment 71 will allow the valve structure to move readily axially during axial expansion or contraction of the thermostat coil.

Instead of making the regulating valve hollow and providing the same with ports which register with regulating passages leading to the high and low pressure ends of the working chambers, this regulating valve, as shown at 76 in Figs. 7 and 8 may be constructed in the form of a cylindrical plug which is provided in its sides with longitudinal grooves 77 adapted to register more or less at their rear ends with the high pressure passages 65, while their front ends register constantly with the rear end of the valve chamber 68 which communicates with the low pressure passages 67.

It will be noted that the grooves or slots 77 present vane surfaces to the high pressure ports 65 so that the fluid rapidly forced through these ports impinges against these vane surfaces and abruptly changes its direction to flow longitudinally through the grooves for escape through the low pressure ports 67. The resulting impact and pressure of the fluid against the vane surfaces will tend to rotate the valve 76 and the vane surfaces are so shaped and positioned relative to the pressure ports 65 that the rotation will be in a direction toward closing movement of the valve and at a rate proportional to the velocity and momentum of the fluid forced through the high pressure ports 65.

Yielding elastic means are provided for resisting the closure movement of the valve by the fluid impact and such resisting means may be the thermostat helix 74. This thermostat element therefore has two functions. It automatically rotates and sets the valve 76 to gauge the fluid passageway to provide the same hydraulic resistance at a definite rate of flow during temperature change, and it serves as a spring for resisting and cooperating with the impact pressure against the valve for closure movement of the valve in proportion to the fluid velocity. Referring to Figure 8, the rotation of the valve toward closing position will be in counter-clockwise direction. The magnitude of the fluid impact may be modified by the proper dimensioning and contour of the vane surface on the valve and the spring constant of the thermostat helix or coil, and with proper dimensioning and proportioning any desired rate of change of shock absorber resistance with piston speed can be obtained, as well as the desired freedom of change of shock absorber resistance with temperature. The valve structure is preferably primarily manually adjusted and set to give approximately the same shock absorber resistance at the number of oscillations per minute corresponding with the frequency of the vehicle springs with which the shock absorbers are to be used. With the valve arrangement shown it is evident that the resistance of a shock absorber will increase fast enough as its speed of movement increases to properly dampen the vehicle spring at both large and small deflections of the spring. The action of the shock absorber will be such that its resistance will be more nearly proportionate to severity of road conditions and such resistance is built up steadily from a boulevard ride to a high speed ride over rough roads, there being no sudden breaks or discontinuances in the action of the shock absorber, but the resistance will be at all times proportional to the speed of operation.

In the construction shown in Figs. 9 and 10 my improvements are embodied in a hydraulic shock absorber having a cylinder 78 forming high and low pressure chambers 79, 80 at opposite ends thereof, a double-ended piston 81 reciprocating in said cylinder and a rock shaft 82 journaled on the body 83 of the instrument and provided with a rock arm 17 which engages with the piston 81. The body 83 of this instrument and the rock shaft 82 are adapted to be connected with the two relatively movable parts between which the shock is to be absorbed so that during a high pressure stroke of the instrument the piston will move toward the high pressure working chamber 79 at one end of the cylinder while during a low pressure stroke this piston moves toward the low pressure working chamber 80 at the opposite end of this cylinder. During a low pressure stroke the liquid is permitted to pass with comparative freedom from the low pressure working chamber 80 to the high pressure working chamber 89 through a by-pass 84 in the piston 81 which is controlled by a check valve 85 opening toward the high pressure chamber 79 and closing toward the low pressure chamber 80.

In order to regulate the flow of the resistance liquid back and forth between the high and low pressure working chambers at opposite ends of the cylinder a valve chamber 86 is provided in the body, the rear end of which is connected by a high pressure regulating passage 87 with the high pressure chamber 79, while the front end of the same is connected by means of a low pressure regulating passage 88 leading to the low pressure end or chamber 80 of the cylinder, said valve chamber containing the following means:

The numeral 89 represents a regulating valve which is movable toward and from a valve seat 90 between the valve chamber 86 and the high pressure passage 87. This regulating valve is arranged on the rear end of a tubular valve stem 91 which is arranged in the valve chamber and provided at its rear end with a guide collar 92 adjacent to the valve 89 and sliding in the bore of the adjacent part of the valve chamber so as to hold the regulating valve 89 in a centered position relative to the valve seat 90.

The front end of the valve stem is journaled in and connected by means of a screw joint 93 with the bore of the abutment sleeve 94, which latter is connected by a screw joint 95 with the bore of the front part of the valve chamber. By turning the abutment 94 in one direction or the other the same together with the valve stem is moved backwardly or forwardly in the valve chamber and thereby enables the regulating valve 89 to be adjusted manually with reference to the seat 90. After such adjustment the abutment may be held in place by a jam nut 96 engaging with the front part of the bore of the valve chamber and engaging with the front end of the abutment sleeve 94. The front end of the valve chamber is closed by means of a plug 97. The valve stem is provided with a longitudinal passage 98 which communicates at its rear end with the valve chamber through the cross passage 98' in the body of the valve 89, while the rear end of this passage communicates with the rear end of the valve chamber.

Within the valve chamber and surrounding the central part of the valve stem is a bi-metallic element 109 similar to the element 55, 56 which is responsive to temperature changes and will uncoil or be extended helically as the temperature increases and will coil up or contract helically as the temperature is reduced. The rear end of this metallic element is secured to the rear part of the valve stem by brazing, pinning or otherwise and the front end is secured to the exterior of the rear end of the abutment 94 in a similar manner.

As the piston 81 moves toward the high pressure end 79 of the cylinder some of the liquid will be forced through the high pressure passage 87 past the valve seat 90, through the hollow valve stem, the front part of the valve chamber and thence through the low pressure passage 88 into the low pressure end 80 of the cylinder. When the temperature of the instrument and the liquid becomes thinner due to increased temperature, the uncoiling of the thermostat element 86 will cause the valve 89 to be moved closer to its seat 90, thereby reducing the freedom of movement of the resistance liquid from the high pressure to the low pressure end of the cylinder, and when the temperature of the instrument or the resistance liquid becomes higher and the liquid becomes thicker then the helical thermostatic element 86 will contract helically and cause the regulating valve 89 to be moved away more or less from its seat 89 and thereby permit the resistance liquid to flow with greater freedom from the high pressure end of the cylinder to the low pressure end thereof so that the instrument will operate uniformly under varying temperature conditions.

This automatic forward and backward movement of the valve 89 results from the turning movement which is imparted to the valve and its stem by the thermostatic element and the screw connection between the valve stem and the abutment or journal member 94 in a manner similar to that which occurs in the construction shown in Figs. 1 to 4.

In Fig. 11 is shown a form of hydraulic piston embodying my invention in which a single piston 99 reciprocates vertically in an upright cylinder 100, which cylinder is formed in a body 101 so as to provide a high pressure chamber 102 in the body at the lower end of the cylinder 100, and a low pressure chamber 103 in the upper part of the body above the cylinder. The depression of the piston 99 is effected by a rock arm 104 engaging with the upper side of the piston and mounted on a rock shaft 105; and the raising of the piston is effected by means of a spring 106 interposed between the bottom of the cylinder 100 and the underside of the piston.

During the upward movement of the piston 99 the same meets with comparatively low liquid resistance inasmuch as this resistance liquid is permitted to flow with comparative freedom from the upper or low pressure chamber 103 to the lower or high pressure chamber 102 through a by-pass or port 107 formed in the piston, and a check valve 108 arranged in this port and opening toward the high pressure chamber but closing toward the low pressure chamber.

The body 101 and the rock shaft 105 are adapted to be operatively connected, respectively, with the two relatively movable parts between which the shock is to be absorbed, for instance, the axle and frame of an automobile.

On the side of the body 101 the same is provided with a thermostatic controlling mechanism which is constructed substantially like that shown in Figs. 9 and 10 excepting that the parts are arranged in an upright position and the high pressure passage 87 of the same is connected with the lower end of the low pressure chamber 102, and the low pressure passage 88 is connected with the low pressure chamber 103 above the piston 99. The same reference characters are therefore applied to the thermostatic controlling device which is shown in the construction shown in Fig. 11, as those which are shown in the construction shown in Fig. 9.

As the piston 99 descends with a high pressure stroke some of the resistance liquid in the lower part 102 of the cylinder will be discharged through the passage 87, past the valve seat 90, through the passage 98 in the hollow valve stem 91 into the upper end of the valve chamber 86 and back through the low pressure passage 88 into the low pressure chamber 103 above the piston 99.

Whenever the temperature of the instrument changes and the resistance liquid becomes either thinner or thicker in response to this temperature change the helical bi-metal thermostatic element 109 operates to either close the valve 89 to a greater extent when the resistance liquid becomes thinner due to higher temperature or moves the same away from the valve seat to a greater extent when the resistance liquid becomes thicker due to a reduction in the temperature, thereby causing the instrument to work uniformly under varying temperature conditions.

In the construction of shock absorbers embodying my improvements shown in Figs. 9–11 no spring is employed between the front end of the valve stem and the closure of the valve chamber in which case the screw joint made between the valve stem and the abutment is made sufficiently loose to permit the helical thermostat element to turn the valve and the valve stem, but no attempt is made to yieldingly hold this regulating valve in its rearmost position toward the cooperating regulating valve seat.

The thermostatic valve herein described is shown in connection with its application to hydraulic shock absorbers. It is not to be inferred however that this form of valve is not applicable to all forms of apparatus in which it is desirable to control the flow of liquid or a gas by means of a change of temperature.

I claim as my invention:

1. A thermostatic valve structure comprising a valve seat, a valve chamber adjacent to said valve seat, a valve in said chamber for cooperating with said seat and having a stem extending therefrom, a stationary abutment in said chamber journaling said valve structure and having threaded connection therewith whereby rotation of said stem will cause axial shift thereof and movement of said valve toward or away from said seat, and a thermostat element connected with said stem to cause rotational movement thereof in response to temperature changes.

2. A thermostatic valve structure comprising a frame having a valve seat, a valve for cooperating with said seat and having a stem extending therefrom, an abutment journaling said stem, a thermostat element connected with said stem to cause rotation thereof and of said valve in accordance with temperature changes, said stem having threaded engagement with said abutment whereby turning of said valve by said thermostat element will effect axial shift of said stem and valve relative to said seat.

3. A thermostatically controlled valve structure comprising a housing having a valve chamber terminating at one end in a valve seat, a valve stem extending through said chamber and having a valve end for cooperating with said seat, an abutment in said valve chamber surrounding and journaling the end of said stem, a thermostat element anchored at one end to said abutment and connected at the other end with said stem and adapted to respond to temperature changes to rotate said stem, said abutment having threaded engagement with said stem whereby rotational movement of said stem by said thermostat element will result in axial movement of said stem for cooperation of its valve end with said seat.

4. In a thermostatic valve structure, the combination of a valve chamber having a valve seat at one end, a valve element in said chamber for cooperating with said seat, an abutment, a thermostat element connected with said valve element and responsive to temperature changes to rotate said valve element, and a connection between said abutment and valve element independent of said thermostat element adapted upon rotation of said valve element by said thermostat element to cause axial shift of said valve element for cooperation with said seat.

5. A thermostatic valve structure comprising an abutment member, a valve member, a thermostat element connected with said abutment and with said valve member and adapted to rotate said valve member relative to said abutment member in response to temperature changes, and a connection between said valve member and abutment member independent of said thermostat element adapted upon rotary movement of said valve member by said thermostat member to cause axial shift of said valve member.

6. A thermostatic valve structure comprising an abutment member, a valve element, a helical thermostat member connected with said abutment and with said valve element and responsive to temperature changes to rotate said valve element relative to said abutment member, and a connection between said abutment member and said valve element independent of said thermostat element adapted to operate in response to turning of said valve element by said thermostat element to axially shift said valve element.

7. A thermostatic valve structure comprising an abutment member, a valve stem concentric with and journaled by said abutment member and having screw engagement at its outer end with said abutment member, the inner end of said stem terminating in a valve, a helical thermostat element concentric with and surrounding said stem and secured at one end to said abutment member and at its other end to said valve and adapted upon change of temperature to rotate said valve and stem, said screw connection responding to turning of said stem by said thermostat element to shift said stem and valve axially.

8. A valve structure comprising a valve chamber having a valve seat at one end, an abutment sleeve at the other end of said chamber, a valve stem in said chamber journaled by and having screw connection at its outer end with said abutment sleeve and terminating at its other end in a valve head for cooperating with said seat, a helical thermostat element surrounding said stem and secured at one end to said abutment sleeve and at its other end to the valve head and responsive to temperature change to rotate said head and stem, said screw connection responding to rotational movement of said stem by said thermostat element to axially shift said stem and valve head, said abutment sleeve being adjustable for manual setting of said valve head relative to said seat.

9. A thermostatic valve structure comprising a frame having a valve seat, a valve structure comprising a valve and a stem extending therefrom, an abutment journaling said stem, a thermostat element connected with said valve structure to cause rotation thereof in accordance with temperature changes, and a connection between said valve structure and abutment adapted upon rotary movement of said valve structure by said thermostat element to cause axial movement of said valve structure to control the adjustment of said valve relative to said seat.

10. A thermostatic valve structure for hydraulic shock absorbers including a valve, an adjusting member, a thermostat element extending between said valve and adjusting member, and a stem extending from said valve and journaled at its end in said adjusting member.

11. A thermostatic valve structure for hydraulic shock absorbers including a valve, a head, a thermostat element extending between said valve and head, and a guide stem extending from said valve and journaled at its end in said head to guide the movement of said valve by said thermostat element.

12. A thermostatic valve structure for hydraulic shock absorbers including a valve, a head, a helical thermostat element extending between said valve and head, and a guide stem extending from said valve through said thermostat element and journaled at its end in said head to guide the movement of said valve by said thermostat element.

13. A thermostatic valve structure for hydraulic shock absorbers including a valve, a head, a thermostat coil connected at its ends to said valve and head respectively, and a stem extending from said valve through said coil and journaled at its end in said head for guiding the movement of said valve by said coil.

14. A thermostatic valve structure for hydraulic shock absorbers including a valve having a passageway therethrough, a head having a passageway therethrough, a thermostat coil connected at its ends with said head and valve respectively, a tubular stem extending from said valve through said coil and journaled at its end in said head passageway to guide the movements of said valve by said coil, said stem and said passageways defining a path for the flow of fluid.

15. A hydraulic valve control comprising a frame forming a valve chamber having a valve seat at one end, a head at the other end of said chamber, a valve for cooperating with said seat to control the flow of fluid, and a stem extending from said valve and journaled in said head to guide the movements of said valve, said stem being in the form of a tube communicating at its ends with the ends of said chamber.

16. A thermostatic hydraulic valve control comprising a frame forming a valve chamber having a valve seat at one end, a head at the other end of said chamber, a valve for cooperating with said seat to control the flow of fluid, a thermostat coil connected at its ends with said head and valve respectively, and a stem extending from said head through said coil and journaled at its end in said head to guide the movements of said valve by said coil, said stem being tubular and communicating at its ends with the ends of said chamber.

17. A unitary valve structure comprising a valve and a stem extending therefrom, an adjustable abutment receiving and journaling the end of the stem, a thermostat coil surrounding the stem and connected with the valve and abutment, and a connection between the stem and abutment adapted during response of said coil to temperature changes to cause combined rotary and axial movement of said stem and valve through a fixed path.

18. A thermostatic valve structure for hydraulic shock absorbers including a valve, an adjusting member, a stem structure extending from said valve and journalled at its end on said adjusting member, and a thermostat element fastened at one end to said valve and anchored at its other end whereby to respond to temperature changes to adjust said valve.

19. A thermostat valve assembly for hydraulic shock absorbers having a resistance fluid bypass, said structure including a valve adapted for controlling said bypass, an adjusting member, a stem structure extending from said valve and journalled at its end on said adjusting member for free rotation, and a helical thermostat element surrounding said stem structure and fastened at one end to said valve and anchored at its other end whereby to respond to temperature changes to move said valve relative to said adjusting member for control of said bypass.

20. A thermostatic valve structure for hydraulic shock absorbers comprising means forming a cylindrical valve seat and having valve ports, a cylindrical valve journalled in said seat and having a stem structure extending therefrom, a head coaxial with said valve and stem structure in which head the outer end of said stem structure is journalled for free rotational movement of said valve and stem structure relative to said head, and a thermostat element anchored at one end and engaging said valve at its other end for moving said valve in said seat and relative to said port to adjust the flow through said port in accordance with temperature changes.

21. A thermostatic valve structure for hydraulic shock absorbers comprising a seat member adapted to be interposed between the pressure chambers of the shock absorber and providing a cylindrical valve seat and having a bypassage, a valve journalled in said cylindrical seat for rotation therein and having a port for cooperating with the bypass, a manually operable adjusting member adapted to be fastened to the structure of the shock absorber, and a bimetallic thermostat element providing an operative connection between said adjusting member and valve for setting said valve in response to operation of said adjusting member and also for adjusting said valve in response to and in accordance with temperature changes independently of the operation of said adjusting member.

22. A thermostatic valve assembly for hydraulic shock absorbers comprising a valve seat member, a guide member, a valve structure journaled at its ends in said members for rotational and axial movement, said seat member having a fluid passage therethrough and said valve structure having ports for controlling said passage, and a thermostat element between said members and connected with said valve structure to automatically set said valve structure for controlling the flow of fluid through said passage in accordance with variations in temperature of the fluid.

23. A thermostat valve assembly for hydraulic shock absorbers, comprising a valve seat member, a guide member, a valve structure journaled at its ends in said members for rotational and axial movement, said seat member having a fluid passage therethrough and said valve structure having a port for controlling said passage, and a thermostat coil connected with said valve structure and responsive to temperature change to rotate and axially shift said structure for setting of its port for control of fluid flow through said passage in accordance with said temperature change.

24. A valve structure for hydraulic shock absorbers comprising a valve seat having a fluid passage therethrough, a rotary valve journalled in said seat for controlling the flow through said passage, said valve having a vane surface exposed to said passage for impingement thereagainst of fluid under pressure and rotation thereby of said valve for control of said passage.

25. A valve structure for hydraulic shock absorbers comprising a valve seat having a fluid passage therethrough, a rotary valve journaled in said seat for controlling the flow through said passage, said valve having a vane surface exposed for impingement thereagainst of fluid flowing under pressure through said passage and rotation of said valve in a direction to restrict said passage, and a spring element resisting such rotation.

26. A valve structure for controlling the flow of displaced fluid in a hydraulic shock absorber, said structure comprising means affording a passage for the flow of displaced fluid, a ported rotary valve for controlling the flow through said passage, said valve having vane surfaces for impingement thereagainst of fluid under pressure and rotation thereby of said valve for control of said passage.

27. A rotary valve for hydraulic shock absorbers constructed and arranged to be rotated to different positions of control by impingement thereagainst of displaced fluid under pressure, and yielding elastic means resisting such rotation.

28. A rotary valve for hydraulic shock absorbers constructed and arranged to be rotated for restriction of fluid flow by the impingement thereagainst of fluid under pressure, and heat responsive means for setting said valve in accordance with temperature changes.

29. A valve structure for hydraulic shock absorbers comprising a seat member having a fluid passage, a rotary valve journaled in said seat member and having a port for cooperating with said passage to control the flow of fluid through said passage, said port presenting a vane surface for impingement thereagainst of fluid flowing through said passage and rotation of said valve by such impingement in a direction for restriction by its port of said passage.

30. A thermostatic valve structure comprising a valve chamber having a valve seat at its inner end, a valve element arranged in said valve chamber for cooperating with said seat, a normally stationary abutment member journaling said valve element by having a screw threaded connection therewith, a thermostat element connected with said valve element and with said abutment member and responsive to temperature changes to turn said valve element, said screw threaded connection being fitted loosely, and a retaining spring pressing against said valve element and tending to hold the cooperating threads of said valve element and abutment in engagement with each other but yielding to the counter pressure of the fluid against the valve element whereby the friction of the threading engagement is relieved for free rotation of the valve element by the thermostat element and axial movement thereof by virtue of said threaded connection.

31. A rotary valve for hydraulic shock absorbers constructed and arranged to be rotated to different positions of control by impingement thereagainst of displaced fluid under pressure, and a thermostat element for setting said valve in accordance with temperature changes and arranged to function as a spring to resist the rotation of said valve by the fluid pressure.

RALPH F. PEO.